United States Patent [19]

Muraoka

[11] Patent Number: 4,739,426
[45] Date of Patent: Apr. 19, 1988

[54] DISK DRIVE SYSTEM

[75] Inventor: Takao Muraoka, Yokohama, Japan

[73] Assignee: Kabushiki Kaisha Toshiba, Kawasaki, Japan

[21] Appl. No.: 921,246

[22] Filed: Oct. 21, 1986

[30] Foreign Application Priority Data

Oct. 23, 1985 [JP] Japan ................. 60-236760

[51] Int. Cl.⁴ ................. G11B 5/012; G11B 23/03
[52] U.S. Cl. ................. 360/97; 360/133; 360/135; 369/282
[58] Field of Search ............ 360/133, 97, 135, 99; 369/282, 290

[56] References Cited

U.S. PATENT DOCUMENTS 832,403  10/1906  Milans .................. 369/282

FOREIGN PATENT DOCUMENTS 57-36473  2/1982  Japan .
539534    9/1941  United Kingdom ........ 369/282

Primary Examiner—A. J. Heinz
Attorney, Agent, or Firm—Oblon, Fisher, Spivak, McClelland & Maier

[57] ABSTRACT

A disk drive system according to the present invention comprises a spindle in a drive unit. The spindle is formed, at its free end, so that it has a flat portion. A magnetic disk which is adapted to be rotated by the spindle is provided having a center hub in its central portion. An opening in the shape of a right-angled isosceles triangle is formed in the center of the center hub. The free end of the spindle can be inserted into the opening, with some play therebetween, only when it is located within a predetermined range of the phase angle of rotation relative to the magnetic disk. The opening has, on its base, a first contact point adapted to abut against one side edge of the flat portion, located on the front side, when the free end of the spindle is inserted into the opening. The opening also has, on the two remaining sides thereof, second and third contact points adapted to engage some other portions of the outer peripheral surface of the free end of the spindle.

9 Claims, 4 Drawing Sheets

DISK DRIVE SYSTEM

FIELD OF THE INVENTION

The present invention relates to a disk drive system comprising, for example, a magnetic disk and a drive unit for rotating the disk, and more specifically, to a disk drive system adapted for use with small-sized magnetic disks having a large memory capacity.

BACKGROUND OF THE INVENTION

In information-processing apparatuses, such as personal computers, word processors, etc., magnetic disk systems are widely used as external data memory units. One such magnetic disk system is disclosed in Japanese Patent Disclosure No. 57-36473. This prior art system is a so-called micro-floppy disk drive system, in which micro-floppy disks with a diameter of less than 5.25, usually 3.5 inches, are used as data-recording media.

Unlike mini-floppy disks of 5.25-inch diameter or standard floppy disks of 8-inch diameter, micro-floppy disks are generally enveloped in a hard casing of synthetic resin, and also have a metallic center hub in their central portion. The center hub has a first hole in its central portion, and a second hole in a position offset from the first hole. The second hole is used in the driving and centering of the micro-floppy disk. When the disk is set on the drive unit, a spindle of the unit is inserted into the first hole, and an urging pin, which is adapted to be rotated in synchronism with the spindle, is fitted into the second hole. With this construction, the disk is rotated around the spindle, while being urged radially outward. In this way, the disk is centered, and is rotated in synchronism with the rotation of the spindle or the urging pin.

In the prior art micro-floppy disks, as described above, the center hub must be formed with first and second independent holes. As for the drive unit for the disk, it requires the urging pin, which is rotated in synchronism with the spindle. This makes the unit complicated in construction.

In the conventional drive unit, moreover, the urging pin is attached to a leaf spring, in order to facilitate the insertion of the pin into the second hole, and to securely urge the micro-floppy disk in the radial direction, by means of the pin. For smoother sliding contact between the urging pin and the inner edge of the second hole, furthermore, a rotary bearing is attached to the end tip of the pin. Thus, the prior art drive unit, in which the disk is rotated and centered by the joint action of the urging pin and second hole, additionally requires not only the pin, but also the spring and bearing. Consequently, the construction of the unit is further complicated.

OBJECT OF THE INVENTION

The object of the present invention is to provide a disk drive system, in which disk and drive unit are both simple in construction, and wherein the disk can be centered with high accuracy.

SUMMARY OF THE INVENTION

The above object of the invention is achieved by a disk drive system which comprises a drive unit including a cylindrical spindle and a motor for rotating the spindle in one direction, the spindle having a free end located at one end of the spindle, and a flat portion formed on the outer peripheral surface of the spindle, the flat portion extending axially over a predetermined distance from the free end; and a disk-shaped recording medium adapted to be rotated by the spindle, the recording medium including a center hub provided in the central portion thereof, and a central opening formed in the center hub and permitting the free end of the spindle to be removably inserted therein, the central opening having a shape such that the free end of the spindle can be inserted therein, with a predetermined amount of play in the rotating direction of the spindle, only when the spindle is located within a predetermined range of the phase angle of rotation, relative to the recording medium, the central opening having, on the inner edge thereof, a contact point adapted to abut against one side edge of the flat portion, said one side edge being located on the front side with respect to the rotating direction of the spindle, when the free end of the spindle is inserted into the central opening, and a retaining region adapted to engage at least a part of the outer peripheral surface of the free end of the spindle, other than the flat portion thereof, thereby holding the recording medium in position relative to the spindle, in cooperation with the contact point, when the spindle is rotating, with the contact point in engagement with the flat portion of the spindle.

According to the disk drive system of the invention, as described above, the disk-shaped recording medium is rotated in synchronism with the rotation of the spindle of the drive unit, only if it is set on the drive unit so that the spindle is fitted in the central opening of its center hub. Also, by doing this, the center of rotation of the recording medium is always in line with the axis of the spindle. More specifically, the free end of the spindle can be inserted into the central opening, with the play in its rotating direction, only when it is located within the predetermined range of the phase angle of rotation, relative to the central opening of the recording medium. While the spindle is rotating, moreover, the one side edge of the flat portion, located on the front side, with respect to the rotating direction of the spindle, engages the contact point on the inner edge of the central opening. Thus, the rotary force of the spindle can be transmitted securely to the record medium, for rotation thereof.

When the free end of the spindle is fitted in the central opening of the disk-shaped recording medium, and when the one side edge of the flat portion of the spindle is in engagement with the contact point, on the inner edge of the central opening, moreover, the inner edge engages some part of the outer peripheral surface of the spindle other than the flat portion thereof. Thus, the recording medium can be held securely in position relative to the spindle. As the spindle rotates, therefore, the recording medium can be rotated always around the axis of the spindle, and it can be centered at the same time.

According to the disk drive system of the present invention, as described above, the free end of the spindle is formed having the flat portion, while the central opening of the recording medium is formed in a predetermined shape. By simply doing this, the recording medium can be rotated and centered by means of the spindle only. Thus, the drive unit can be made simpler in construction, and the disk can be manufactured more easily than those of the prior art.

As for the compatibility of the drive unit, or the adaptability of the recording medium to two or more independent drive units, this can be achieved by making the outside diameters of the free ends of the individual drive units uniform, and with high accuracy. If the outside diameters are equal, the recording medium can be rotated around the same axis (i.e., around the axis of the spindle) without regard to which drive unit is being used. It is relatively easy to make the spindle have a highly accurate outside diameter. Accordingly, the compatibility of the drive unit can be assured.

DETAILED DESCRIPTION OF THE PREFERRED EMBODIMENTS

Figure 1:
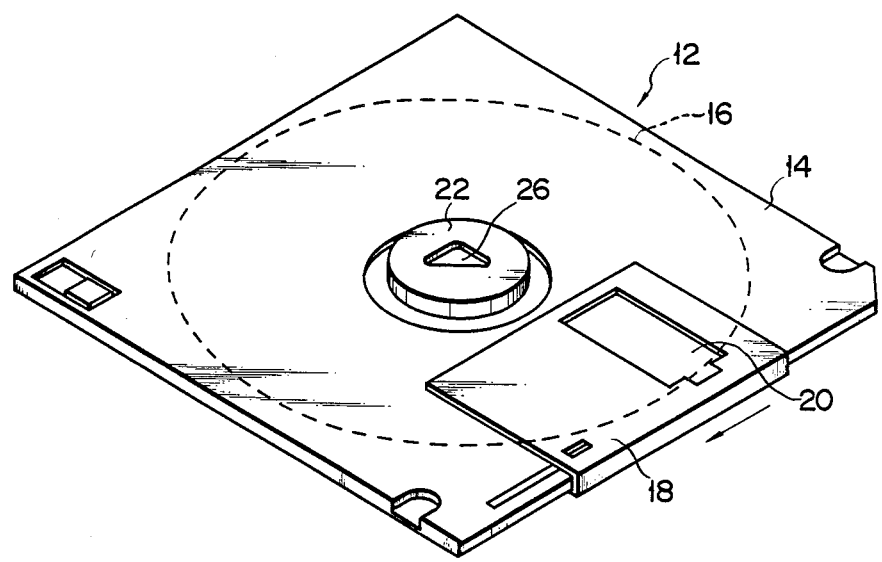
FIG. 1 is a perspective view of a magnetic disk cassette according to an embodiment of the present invention.

Referring now to FIG. 1, there is shown a magnetic disk cassette 12. The cassette 12 comprises a substantially square casing 14 formed of synthetic resin, and a magnetic disk 16 contained in the casing 14 for rotation. In general, the disk 16 is a so-called micro-floppy disk with a diameter of less than 5.25 inches. A magnetic record layer (not shown) is formed on each side of the disk 16. The metallic shutter 18 is attached to one side portion of the casing 14, so as to hem it in and to be slidable along it. The shutter 18 is formed with a pair of apertures 20, on its upper and lower sides, as in FIG. 1, facing each other across the casing 14. The apertures 20 are adapted to be aligned individually with a pair of access holes (not shown), previously formed in the casing 14, when the shutter 18 is moved in the direction of the arrow from the position shown in FIG. 1. Thus, the disk 16 can be exposed through the access holes and the apertures 20.

Figure 2:
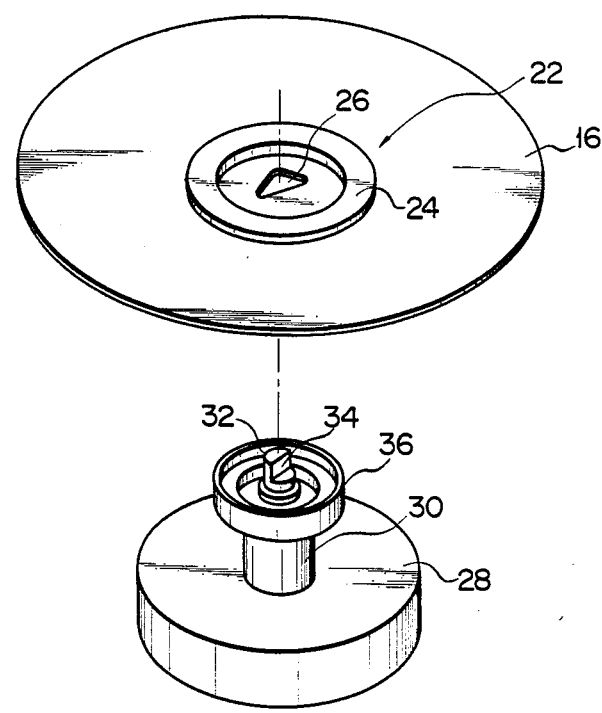
FIG. 2 is an exploded perspective view showing a magnetic disk and part of a drive unit.

Referring now to FIGS. 1 and 2, a center hub 22 is attached to the central portion of the magnetic disk 16. In this embodiment, the hub 22 is formed of magnetic metal material. The center hub 22, which is in the form of a circular ashtray-shaped plate, has flange portion 24 fixed on one side of the disk 16. As seen from FIGS. 1 and 3, the bottom portion of the hub 22 projects from the the other side of the disk 16. In FIG. 2, the casing 14 is omitted for simplicity of illustration.

An opening 26 is formed in the center of the bottom portion of center hub 22.

Besides the magnetic disk 16, part of a drive unit, used to rotate the disk 16, is shown in FIG. 2. The drive unit includes a flat electric motor 28. The motor 28 is coupled with the proximal end of a cylindrical spindle 30, and the spindle 30 can be rotated in one direction by the motor 28. The distal end portion of the spindle 30 serves as a free end 32 which can be inserted into the opening 26 in the magnetic disk 16. The free end 32 is smaller in diameter than the proximal end portion of the spindle 30. A flat portion 34 is formed on part of the outer peripheral surface of the free end 32 of the spindle 30. It extends from the end face of the free end 32 toward the proximal end of the spindle 30 over a predetermined distance in the axial direction of the spindle 30.

Figure 3:
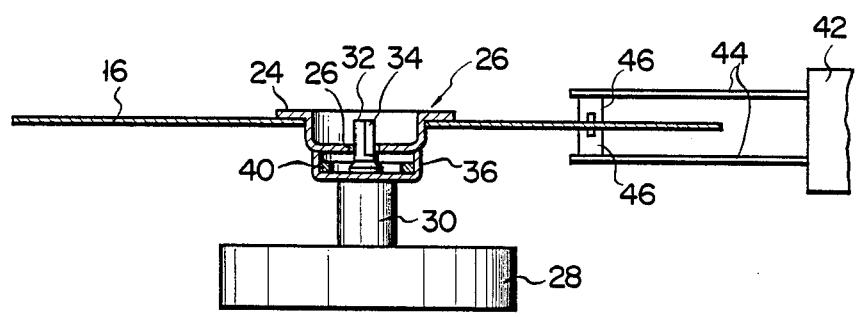
FIG. 3 is a schematic view of the magnetic disk set in position on the drive unit.

Further, the spindle 30 is fitted with a cylindrical member 36 that has a hole in the upper end thereof and that surrounds the free end 32. When the magnetic disk 16 is mounted on the spindle 30, as shown in FIG. 3, the bottom portion of the center hub 22 of the disk 16 is contacts the upper end of the cylindrical member 36. A ring-shaped magnet 40 is fixed to the inner bottom surface of the cylindrical member 36. Thus, when the bottom portion of the hub 22, formed of magnetic material, contacts the member 36, it is held by the magnetic force of the magnet 40.

FIG. 3 further shows a magnetic head assembly. The head assembly includes an access arm 42, which is fitted with a pair of gimbals arms 44. In the state shown in FIG. 3, the arms 44 extend parallel to each other and so as to hold the magnetic disk 16 between them. A magnetic head 46 is attached to the distal end of each of the gimbals arm 44. The heads 46 face each other with the disk 16 between them.

Figure 4:
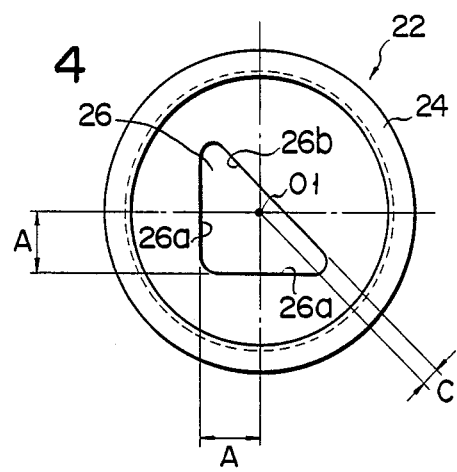
FIG. 4 is a plan view showing a center hub of the magnetic disk of FIG. 2.
Figure 5:
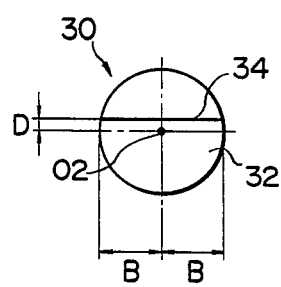
FIG. 5 is a plan view of a spindle of the drive unit of FIG. 2.

Referring now to FIGS. 4 and 5, there are shown, further in detail, the center hub 22 and the free end 32 of the spindle 30. In this embodiment, as seen from FIG. 4, the opening 26 of the hub 22 is in the form of a right-angled isosceles triangle, rounded at its vertex portions. The distance A between each of two equal sides $26a$ of the opening 26 and the center $01$ of the hub 22 is equal to the radius B of the free end 32 of the spindle 30, shown in FIG. 5. The distance C between the base $26b$ of the opening 26 and the center $01$ is longer than the distance D between the flat portion 34 and the axis $02$ of the spindle 30.

Figure 6:
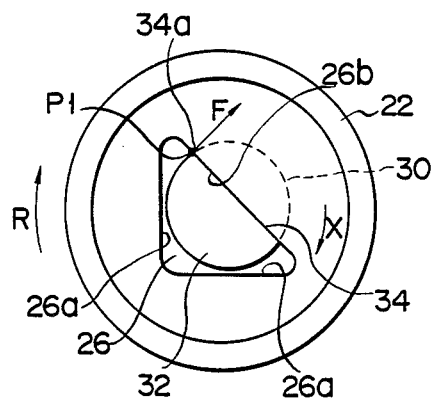
FIG. 6 is a plan view showing a state immediately after the spindle of the drive unit of FIG. 2 is fitted in an opening of the magnetic disk of FIG. 2.
Figure 7:
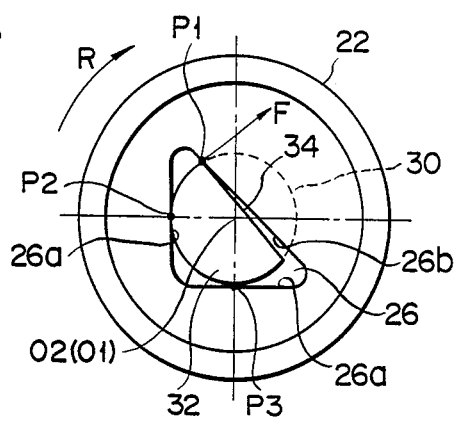
FIG. 7 is a plan view showing a state such that the magnetic disk is fitted properly on the spindle shown in FIG. 6.

Referring now to FIGS. 6 and 7, there will be described the way the magnetic disk 16 is set on the drive unit. The magnetic disk cassette 12 or disk 16 is guided to the region over the free end 32 of the spindle 30, by a loading mechanism (not shown) in the drive unit. By this time, the magnetic heads 46 are previously moved away from disk 16, following the gimbals arms 44. Thereafter, disk 16 is moved toward the free end 32 of the spindle 30, so that the free end 32 is expected to be inserted into the opening 26 of the center hub 22 of disk 16. However, the free end 32 sometimes cannot be inserted into the opening 26, due to the difference in shape between the free end 32 and the opening 26. Only when the spindle 30 is rotated in one direction so that the flat portion 34 of the free end 32 is parallel to the base $26b$ of opening 26, can the free end 32 be inserted into the opening 26, as shown in FIG. 6. Then, the bottom portion of the center hub 22 of the magnetic disk 16 contacts the cylindrical member 36 of the spindle 30, and the center hub 22 is held by the magnetic force of the magnet 40. Thus, the disk 16 is mounted properly on the spindle 30.

The aforementioned process, beginning at the start of insertion of the free end 32 into the opening 26 of the magnetic disk 16, and ending in the proper setting of the disk 16, has been explained with respect to the axial direction of the spindle 30. This process will now be reviewed with respect to the rotating direction of the spindle 30. At the point of time when the free end 32 of spindle 30 starts to be inserted into the opening 26 of the disk 16, the opening 26 and the free end 32 can be supposed to have a positional correlation as shown in FIG. 6. In this state, the disk 16 is fitted on the free end 32, leaving the predetermined play around the axis of the spindle 30.

When the spindle 30 is rotated in the direction indicated by the arrow R in FIG. 6, with the opening 26 and the free end 32 held in the state of FIG. 6, one side edge 34a of the flat portion 34 of the end portion 32, located on the front side with respect to the rotating direction, engages the base 26b of the opening 26 at a contact point P1. As spindle 30 and the center hub 22 thus engage each other at the point P1, the magnetic disk 16 is subjected to the rotary force of the spindle 30, as indicated by the arrow F in FIG. 6. When the disk 16 receives the force F from the spindle 30 in this manner, it is rotated together with the spindle 30. At this time, the disk 16 is subjected to a component of the force F, so that it is moved relative to the free end 32 of the spindle 30 in the direction indicated by the arrow X in FIG. 6. As a result, some other portions of the peripheral surface of free end 32 (i.e., other than the flat portion 34) come into contact with the two equal sides 26a of the opening 26 at contact points P2 and P3, as shown in FIG. 7. Thus, the magnetic disk 16 is supported by free end 32 of the spindle 30 at the contact points P1, P2 and P3. Subjected to rotary force F of the spindle 30, the disk 16 rotates together with the spindle 30 in the direction of the arrow R, thus maintaining the state shown in FIG. 7. The above-mentioned rotary force F further increases due to the friction caused when the magnetic heads 46 move on magnetic disk 16. Therefore, the state illustrated in FIG. 7 is maintained in a further reliable manner.

In this embodiment, moreover, the distances A and B are equal, so that the center 01 of the center hub 22 of the magnetic disk 16 is in line with the axis 02 of the spindle 30. Accordingly, the disk 16 is rotated around the axis 02. In other words, the disk 16 is centered in a manner such that its center 01 of rotation is in alignment with the axis 02 of the spindle 16.

The moment the magnetic disk 16 starts to rotate, the magnetic heads 46 come into sliding contact with their corresponding surfaces on the disk 16. It is to be understood, in this case, that the shutter 18 of the magnetic disk cassette 12 is opened in advance.

According to the disk drive system of the present invention, moreover, when the magnetic disk 16 is mounted on the spindle 30, the bottom portion of the center hub 22 of the disk 16 is attracted to the magnet 40 on cylindrical member 36 of the spindle 30. Therefore, the disk 16 can be located highly accurately with respect to the axial direction of the spindle 30.

In the embodiment described above, the center 01 of the center hub 22 and the axis 02 of the spindle 30 are aligned, as aforesaid, when the magnetic disk 16 is mounted on the free end 32 of the spindle 30. The present invention is not, however, limited to such an arrangement. In short, according to the disk drive system of the invention, rotary force F of the spindle 30 is transmitted to the disk 16 by bringing one side edge 34a of the flat portion 34 of the spindle 30 into contact with the contact point P1 of the opening 26 of the disk 16. In this state, the inner edge of opening 26 of the disk 16 must only be held securely on the free end 32 of the spindle 30. In this case, therefore, the magnetic disk 16 is rotated always around the axis 02 of the spindle 30, even though the center 01 of the hub 22 is not in line with the axis 02.

Figure 8:
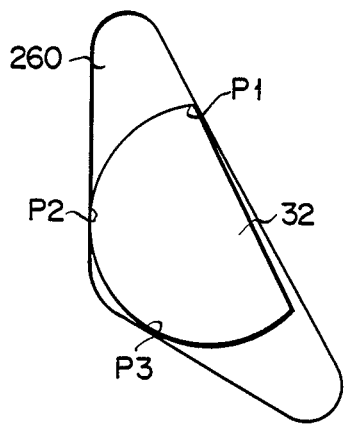
FIGS. 8 to 10 show the ways the spindle is fitted in various center hubs with openings of different shapes.
Figure 9:
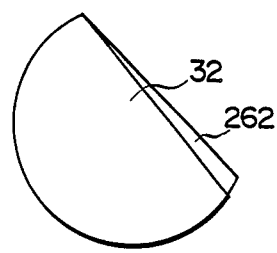
Figure 10:
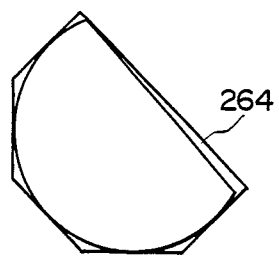

Accordingly, the opening 26 of the center hub 22 may enjoy various modifications in shape, as shown in FIGS. 8 to 10. Unlike the opening 26 of FIG. 4, the opening 260 shown in FIG. 8 has the shape of an obtuse-angle isosceles triangle. The opening 262 shown in FIG. 9 resembles the cross section of the free end 32 of spindle 30 in shape. The opening 264 shown in FIG. 10, moreover, is a polygonal version of the semicircular opening 262 of FIG. 9.

Thus, the opening of the center hub 22 of the magnetic disk 16 may be formed into various shapes. In short, it must only be shaped so that the free end 32 of the spindle 30 can be inserted into the opening only when it is located within the predetermined range of phase angle of rotation relative to the disk 16.

What is claimed is:

1. A disk drive system comprising:
   (a) a drive unit including a cylindrical spindle and a motor for rotating said spindle in one direction, said spindle having a free end located at one end of said spindle and a flat portion formed on the outer peripheral surface of said spindle, said flat portion extending axially over a predetermined distance from said free end; and
   (b) a disk-shaped recording medium adapted to be rotated by said spindle, said recording medium including a center hub provided in the central portion thereof and a central opening formed in said center hub and permitting said free end of said spindle to be removably inserted therein, said central opening having a shape such that said free end of said spindle can be inserted therein with a predetermined amount of play in the rotating direction of said spindle only when said spindle and said central opening are angularly aligned,
   (c) said central opening having, on an inner edge thereof, a contact point on a planar base portion of said central opening adapted to abut against one side edge of said flat portion, said one side edge being located on a front side with respect to the rotating direction of said spindle, when said free end of said spindle is inserted into said central opening, and a retaining region adapted to engage at least a part of the outer peripheral surface of said free end of said spindle, other than said flat portion thereof, thereby holding said recording medium in position relative to said spindle, in cooperation with said contact point, when said spindle is rotating with said contact point in engagement with said flat portion of said spindle,
   (d) said flat portion of said free end of said spindle being formed in a manner such that the axis of said spindle is located outside said flat portion and the distance between said base portion of said central opening and the center of said center hub is greater than the distance between the axis of said spindle and said flat portion.

2. The system according to claim 1, wherein said central opening is substantially in the shape of an isosceles triangle.

3. The system according to claim 2, wherein the three corners of said central opening are rounded.

4. The system according to claim 3, wherein said central opening is in the shape of a right-angled isosceles triangle.

5. The system according to claim 1, wherein:

(a) said spindle is fitted with a cylindrical member surrounding said free end and
(b) said center hub of said recording medium is formed with a portion adapted to be fitted on said cylindrical member when said free end of said spindle is inserted into said central opening of said recording medium.

6. The system according to claim 5, wherein:
(a) said center hub is formed of a magnetic material and
(b) said cylindrical member of said spindle houses a magnet adapted to attract said center hub.

7. The system according to claim 1, wherein said central opening is substantially in the shape of a semicircle.

8. The system according to claim 7, wherein the side of the semicircle other than said planar base portion is curved.

9. The system according to claim 7, wherein the side of the semicircle other than said planar base portion is composed of a plurality of flat surfaces.

* * * * *